United States Patent [19]

Cerutti

[11] Patent Number: 4,985,050

[45] Date of Patent: Jan. 15, 1991

[54] SUPPORTED THERMALLY STABLE CUBIC BORON NITRIDE TOOL BLANKS AND METHOD FOR MAKING THE SAME

[75] Inventor: David B. Cerutti, Worthington, Ohio

[73] Assignee: General Electric Company, Worthington, Ohio

[21] Appl. No.: 394,349

[22] Filed: Aug. 15, 1989

[51] Int. Cl.$^5$ .............................................. B24D 3/00
[52] U.S. Cl. .......................................... 51/293; 51/309
[58] Field of Search .................................. 51/293, 309

[56] References Cited

U.S. PATENT DOCUMENTS

| | | |
|---|---|---|
| 3,744,982 | 7/1973 | Bovenkerk et al. .................. 51/293 |
| 4,505,721 | 3/1985 | Almond et al. ...................... 51/309 |
| 4,673,414 | 6/1987 | Lavens et al. ....................... 51/293 |
| 4,690,691 | 9/1987 | Komandeiri ......................... 51/309 |
| 4,807,402 | 2/1989 | Rai ....................................... 51/293 |
| 4,828,582 | 5/1989 | Frushour ............................. 51/293 |

*Primary Examiner*—William R. Dixon, Jr.
*Assistant Examiner*—Willie J. Thompson
*Attorney, Agent, or Firm*—Gary L. Loser

[57] ABSTRACT

A method for making supported, thermally stable cubic boron nitride (CBN) or wurtzitic boron nitride (WBN) compacts or wire dies comprising providing a mass of sinterable CBN and WBN particles substantially free of catalytic material and a metal bonded support mass or annulus; positioning a barrier layer between said CBN or WBN mass and said support mass; and subjecting such arrangement of materials to pressure and temperature conditions for a time effective for sintering said CBN or WBN particles and substantially preventing migration of metal bond material into the CBN or WBN mass.

15 Claims, No Drawings

SUPPORTED THERMALLY STABLE CUBIC BORON NITRIDE TOOL BLANKS AND METHOD FOR MAKING THE SAME

BACKGROUND OF THE INVENTION

1. Field of the Invention

The present invention generally relates to thermally stable abrasive compacts or tool blanks comprising a polycrystalline cubic boron nitride (CBN) or wurtzitic boron nitride (WBN) abrasive or cutting layer bonded to a support material such as a cemented carbide. More particularly, the present invention relates to a method for making such thermally stable tool blanks by positioning a metal barrier disc between the support material and a sinterable, catalyst-free layer of cubic boron nitride or wurtzitic boron nitride particles, and subjecting such arrangement to temperature and pressure conditions effective for forming a composite compact.

2. Prior Art

Polycrystalline cubic boron nitride tool blanks have found wide acceptance in the machining art, especially for the machining of ferrous alloys. U.S. Pat. No. 3,743,489 discloses one such tool blank in which a unified mass of greater than 70 volume percent CBN crystals are bonded to a larger sintered carbide for support. The mass of cubic boron nitride crystals includes a metallic phase containing aluminum atoms and atoms of at least one alloying element selected from the group consisting of nickel, cobalt, manganese, iron, vanadium and chromium. Tool blanks of this type are not considered to be thermally stable due to the presence of the sin aluminum alloy in the CBN layer. Because the aluminum alloy has a coefficient of thermal expansion which is significantly different from that of cubic boron nitride, at elevated temperatures, such as may be encountered in cutting or milling operations, the aluminum alloy expands causing the CBN layer to crack or fracture.

U.S. Pat. No. 3,767,371 describes polycrystalline CBN tool blanks comprising a unified mass of greater than 70 volume percent CBN crystals bonded to a metal-bonded carbide support mass. The carbide material is predominantly tungsten carbide, titanium carbide, tantalum carbide or mixtures thereof and the metal bonding material is selected from the group consisting of cobalt, nickel, iron and mixtures thereof. Tool blanks of this type are not thermally stable because metal bonding material migrates from the carbide support to the CBN layer where it serves as a cement material. Once again, thermal instability is due to the fact that the metal bonding material has a coefficient of thermal expansion which is significantly different than that of cubic boron nitride.

U.S. Pat. No. 4,063,909 relates to cemented tungsten carbide supported cubic boron nitride compacts having a continuous layer of high temperature braze metal less than 0.5 mm in thickness disposed between the CBN layer and the carbide support. Such abrasive bodies can be prepared in situ by subjecting the CBN abrasive particles, the braze metal and the cemented carbide support or carbide molding powder to temperatures and pressures in the cubic boron nitride stable region of the boron nitride phase diagram. Suitable braze metals include titanium, nickel, cobalt, iron, chromium, manganese, vanadium, molybdenum, tantalum, platinum and alloys containing one or more of these metals.

U.S. Pat. No. 4,224,380 pertains to thermally stable tool components comprising between 70 and 90 volume percent self-bonded CBN particles; a metallic phase infiltrated substantially uniformly throughout, said phase comprising between about 0.05 and 3 volume percent of the CBN layer and said phase being selected from cobalt, cobalt alloys, and alloys of aluminum with a metal selected from the group consisting of nickel, manganese, iron, vanadium and chromium; and a network of interconnected pores dispersed throughout. Although CBN tool blanks of this type are thermally stable, it would nevertheless be desirable to provide thermally stable CBN tool blanks without a network of interconnected pores.

U.S. Pat. No. 4,673,414 describes a method for making re-sintered polycrystalline cubic boron nitride compacts which comprises placing sintered boron-rich polycrystalline CBN particles in a high pressure/high temperature (HP/HT) apparatus and subjecting the boron-rich CBN particles to a pressure and a temperature adequate to re-sinter the CBN particles. Products of this type are normally made without a carbide support in order to provide a thermally stable tool blank. If a cemented carbide support is employed, metal bond material such as cobalt infiltrates into the CBN layer with the result that the CBN layer is no longer thermally stable. Of course, in the absence of a cemented carbide support, the tool blank will be entirely composed of CBN and, therefore, will be quite expensive. Moreover, in the absence of a support, the CBN layer will be more susceptible to fracturing.

U.S. Pat. No. 4,797,326 provides a process for making supported CBN compacts by separately forming a sintered CBN compact and a plastically deformable support, mating the CBN compact and the support, subjecting the mated CBN compact and support to elevated pressure and temperature conditions sufficient to plastically deform the support surface into attachment with the compact surface, and recovering the resulting supported compact. Although this method is capable of providing supported thermally stable CBN tool blanks, it would be desirable to provide such tool blanks in a process which does not require separate manufacture of the CBN compact and the support mass.

SUMMARY OF THE INVENTION

It is an object of the present invention to provide supported thermally stable cubic boron nitride or wurtzitic boron nitride tool blanks in which the CBN or WBN layer is substantially free of materials other than cubic boron nitride or wurtzitic boron nitride.

It is another object of the present invention to provide a method for the manufacture of supported thermally stable CBN or WBN tool blanks wherein the abrasive layer and the support mass need not be separately manufactured.

In accordance with the foregoing objects, there are provided supported thermaly stable polycrystalline compacts comprising a CBN or WBN abrasive layer, a metal-bonded support mass, and a barrier layer disposed between said abrasive layer and said support mass, said abrasive layer being substantially free of catalyst and metal bond material.

According to the method of the present invention, supported thermally stable compacts are prepared by providing a mass of cubic boron nitride or wurtzitic boron nitride particles substantially free of any other materials and a pre-cemented support mass or a suitable molding powder for in situ manufacture of said support mass; positioning a suitable barrier layer between said CBN or WBN particles and said support mass or support mass molding powder; and subjecting such assembly to conditions of pressure and temperature effective for forming a composite compact.

Hereinafter, the term "cubic boron nitride" or "CBN" will be understood to include wurtzitic boron nitride and mixtures of cubic boron nitride and wurtzitic boron nitride.

DESCRIPTION OF THE INVENTION

In one aspect, the present invention provides abrasive compacts comprising a non-porous, thermally stable cubic boron nitride layer, said CBN layer being substantially free of any other materials, a support mass, and a barrier layer disposed between said CBN layer and said support mass which is effective for substantially preventing migration of metal bond from the support mass to the CBN layer.

The CBN particles used in making the supported compacts of the present invention may be made by any suitable technique. One technique involves the preparation of boron-rich polycrystalline CBN particles by processing mixtures of hexagonal boron nitride (HBN) powder and either elemental boron or various boron-containing compounds, e.g. $AlB_{12}$, as described in British Pat. No. 1,513,990. Another process involves generating excess boron on the surface of oxide-free HBN prior to its conversion to cubic boron nitride. The excess boron is generated by a pre-treatment which is carried out at a temperature in the hexagonal boron nitride decomposition range by vacuum firing and heating under an inert atmosphere, followed by a conversion to CBN by high pressure/high temperature (HP/HT) processing as described in U.S. Pat. No. 4,289,503, which is incorporated herein by reference. An especially preferred CBN material for use in the practice of the present invention is available from General Electric Company under the trademark BORAZON CBN 550.

Regardless of the process employed, boron-rich polycrystalline CBN is generally produced in large chunks which are milled to particle sizes more suitable for use in a particular application. For purposes of the present invention, the particle size is not critical and generally is the same size as conventional CBN particles subjected to HP/HT conditions for format ion of conventional polycrystalline CBN compacts, such as described in U.S. Pat. No. 3,767,371.

It should be appreciated that boron-rich polycrystalline CBN particles are already "sintered" in their formation so that in the process of the present invention the CBN particles are "re-sintered". Furthermore, unlike conventional cubic boron nitride particles which are formed into sintered compacts utilizing a catalyst or other means for achieving bonding, the present invention employs only cubic boron nitride particles which can be re-sintered without the aid of a catalyst at temperature and pressure conditions similar to those used in processes which employ a catalyst.

The support mass or the molding powder for in situ formation of a support mass can be of any material well known in the art. Preferably, the support mass is a metal bonded carbide, with the carbide being selected from the group consisting of tungsten carbide, titanium carbide, tantalum carbide and mixtures thereof, and the metal bonding material being selected from the group consisting of cobalt, nickel, iron and mixtures thereof. It is especially preferred that cobalt cemented tungsten carbide be employed as the support mass.

It is well known in the art that metal bond material, such as cobalt, will sweep from the cemented carbide support into the CBN layer during HP/HT processing. The present invention resides in the discovery that the presence of a barrier layer substantially identical in circumference to the carbide support can delay migration of the metal bond material into the CBN layer for a time effective for re-sintering the CBN particles while also permitting effective bonding between the CBN layer and the support mass. As a consequence, there are provided thermally stable, non-porous CBN compacts in which the CBN layer is substantially free of materials other than CBN.

The barrier layer employed in the practice of the present invention can be any material which is effective for delaying or preventing migration of metal-bond material from the support mass to the CBN layer during HP/HT processing. Tantalum, tungsten and titanium are preferred for use as the barrier layer, with tantalum being especially preferred.

The thickness of such barrier layer can vary in thickness according to the material used, however, as a general guideline it should be between about 0.02 mm and 1.0 mm thickness. When tantalum is used as the barrier layer, a thickness of from about 0.05 mm to about 0.4 mm has been found to be particularly effective.

According to another aspect of the present invention, there is provided a method for making supported, thermally stable compacts comprising providing a mass of sinterable cubic boron nitride substantially free of catalytic material and a metal-bonded support mass or a molding powder for in situ formation of a metal-bonded support mass; positioning a barrier layer between the CBN mass and support mass or molding powder; and subjecting such assembly to pressure and temperature conditions for a time effective for re-sintering the cubic boron nitride particles while delaying or substantially preventing migration of metal bond material from the support mass or molding powder to the CBN layer. Of course, the conditions must be such that the barrier layer does not melt so that unregulated infiltration of metal-bond material into the CBN layer will result.

It will be apparent to those of ordinary skill in the art that the present invention can readily be adapted for use in the manufacture of wire dies by placing the barrier layer between the CBN core and the metal-bonded annulus.

In order to better enable those skilled in the art to practice the present invention, the following examples are provided by way of illustration and not by way or limitation. All parts are by weight unless otherwise noted.

EXAMPLES

Example 1

Self-sinterable, boron rich polycrystalline cubic boron nitride was prepared in accordance with the disclosure of U.S. Pat. No. 4,673,414. This material was ground into a fine powder and placed adjacent to a cobalt cemented tungsten carbide substrate in a conventional high pressure/high temperature reaction cell. Following reaction, the resultant tungsten carbide supported CBN compacts were found to be well sintered but did not exhibit satisfactory bonding between the CBN layer and the tungsten carbide substrate. Analysis of the compacts revealed that cobalt had migrated from the cemented tungsten carbide substrate into the CBN layer, adversely affecting the thermal stability of the CBN layer and the bond between the CBN layer and the tungsten carbide substrate.

Example 2

The procedure of Example 1 was repeated except that the cobalt cemented tungsten carbide substrate was enclosed in a tantalum foil. The compacts resulting from exposure to high pressure/high temperature conditions not only were well sintered, but also exhibited excellent adhesion between the CBN layer and the cemented carbide support. A cross section of the compact was analyzed to determine if cobalt from the carbide support had migrated into the CBN layer. The analysis revealed that the cobalt was confined to the cemented tungsten carbide, although there was a slight concentration of cobalt at the interface between the tantalum barrier and the tungsten carbide substrate. There was thus provided a compact in which the thermal stability of the CBN layer was protected and which also provided excellent adhesion of the tantalum to both the CBN layer and the tungsten carbide substrate.

I claim:

1. A method for making supported thermally stable cubic boron nitride or wurtzitic boron nitride compacts or wire dies, comprising providing a mass of sinterable cubic boron nitride or wurtzitic boron nitride particles substantially free of catalytic material and a metal-bonded support mass or annulus or a molding powder for in situ formation of a metal-bonded support mass or annulus; positioning a barrier layer between said mass of sinterable cubic boron nitride or wurtzitic boron nitride particles and said metal-bonded mass or annulus or said molding powder; and subjecting such arrangement of materials to pressure and temperature conditions for a time effective for sintering said cubic boron nitride or wurtzitic boron nitride particles and substantially preventing migration of metal bond material from said support mass or said molding powder into said mass of cubic boron nitride or wurtzitic boron nitride.

2. A method as set forth in claim 1, wherein the pressure and temperature conditions are insufficient to cause melting of the barrier layer.

3. A method as set forth in claim 1, wherein the barrier layer is selected from the group consisting of tantalum, tungsten and titanium.

4. A method as set forth in claim 1 wherein the barrier layer is tantalum.

5. In a method for making supported thermally stable cubic boron nitride compacts comprising providing a mass of sinterable cubic boron nitride particles substantially free of catalytic material and a metal bonded support mass or a molding powder for in situ formation of a metal-bonded support mass; the improvement consisting essentially of positioning a barrier layer between said mass of sinterable cubic boron nitride particles and said metal-bonded mass or molding powder, and subjecting such arrangement of materials to pressure and temperature conditions for a time effective for sintering said cubic boron nitride particles and substantially preventing migration of metal bond material from said support mass or said molding powder into said mass of cubic boron nitride.

6. A cubic boron nitride or wurtzitic boron nitride compact or wire die manufactured by a method which comprises providing a mass of sinterable cubic boron nitride or wurtzitic boron nitride particles substantially free of catalytic material and a metal-bonded support mass or annulus or a molding powder for in situ formation of a metal-bonded support mass or annulus; positioning a barrier layer between said mass of sinterable cubic boron nitride or wurtzitic boron nitride particles and said metal-bonded mass or annulus or said molding powder; and subjecting such arrangement of materials to pressure and temperature conditions for a time effective for sintering said cubic boron nitride or wurtzitic boron nitride particles and substantially preventing migration of metal bond material from said support mass or said molding powder into said mass of cubic boron nitride or wurtzitic boron nitride.

7. A compact as set forth in claim 6, wherein the support is a cemented carbide.

8. A compact as set forth in claim 7, wherein the carbide is selected from the group consisting of tungsten carbide, titanium carbide, tantalum carbide and mixtures thereof.

9. A compact as set forth in claim 8, wherein the cement is selected from the group consisting of cobalt, nickel, iron and mixtures thereof.

10. A compact as set forth in claim 9, wherein the support is cobalt cemented tungsten carbide.

11. A supported, thermally stable polycrystalline cubic boron nitride compact consisting essentially of:
    (a) a sintered mass of cubic boron nitride substantially free of other materials;
    (b) a support mass; and
    (c) a barrier layer disposed intermediate said sintered mass of cubic boron nitride and said support mass.

12. A compact as set forth in claim 11, wherein the cubic boron nitride particles are boron rich.

13. A compact as set forth in claim 12, wherein the barrier layer is selected from the group consisting of tantalum, tungsten and titanium.

14. A compact as set forth in claim 12, wherein the barrier layer is tantalum.

15. A compact as set forth in claim 13, wherein the support is a cemented carbide.

* * * * *